Patented Sept. 9, 1952

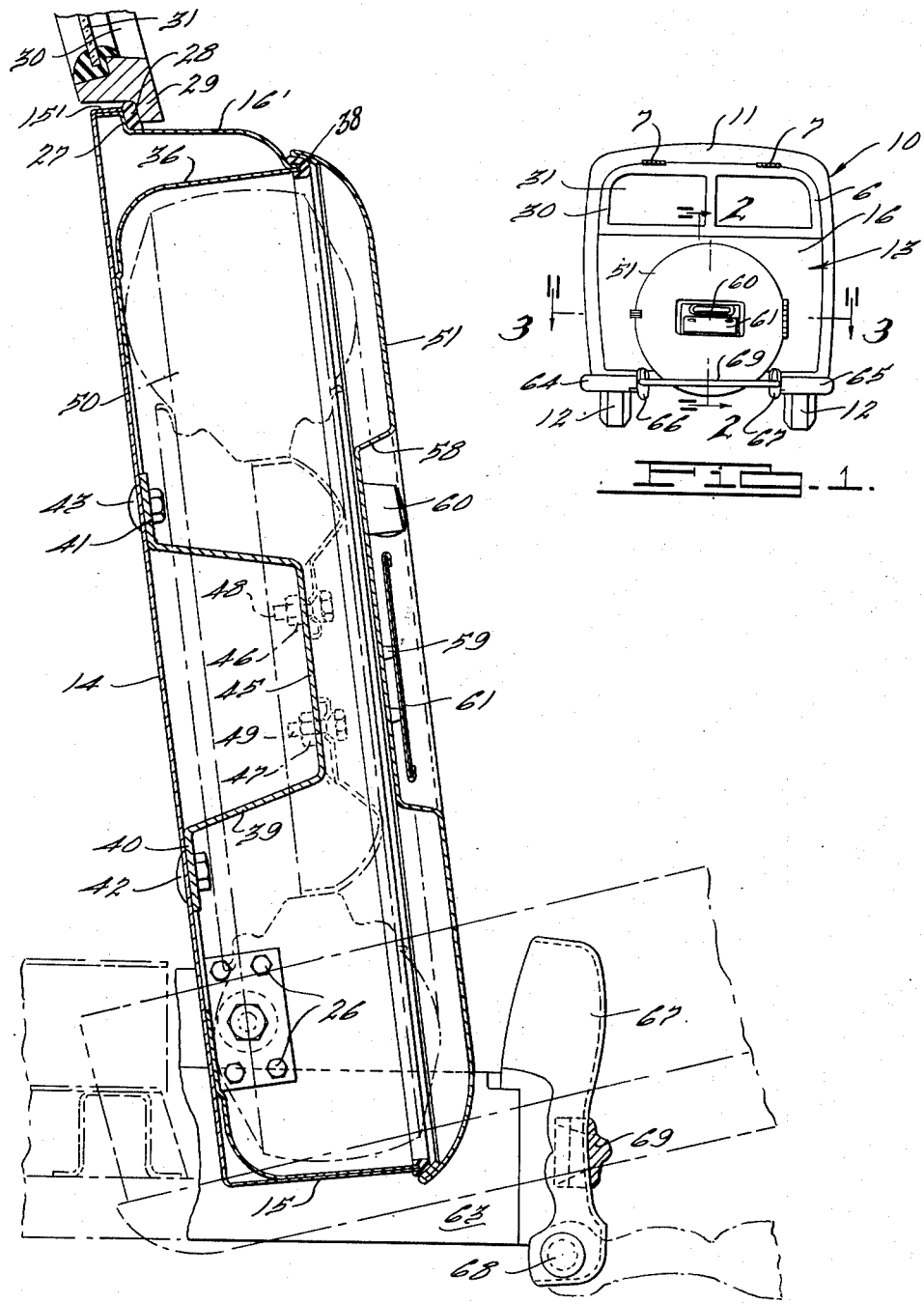

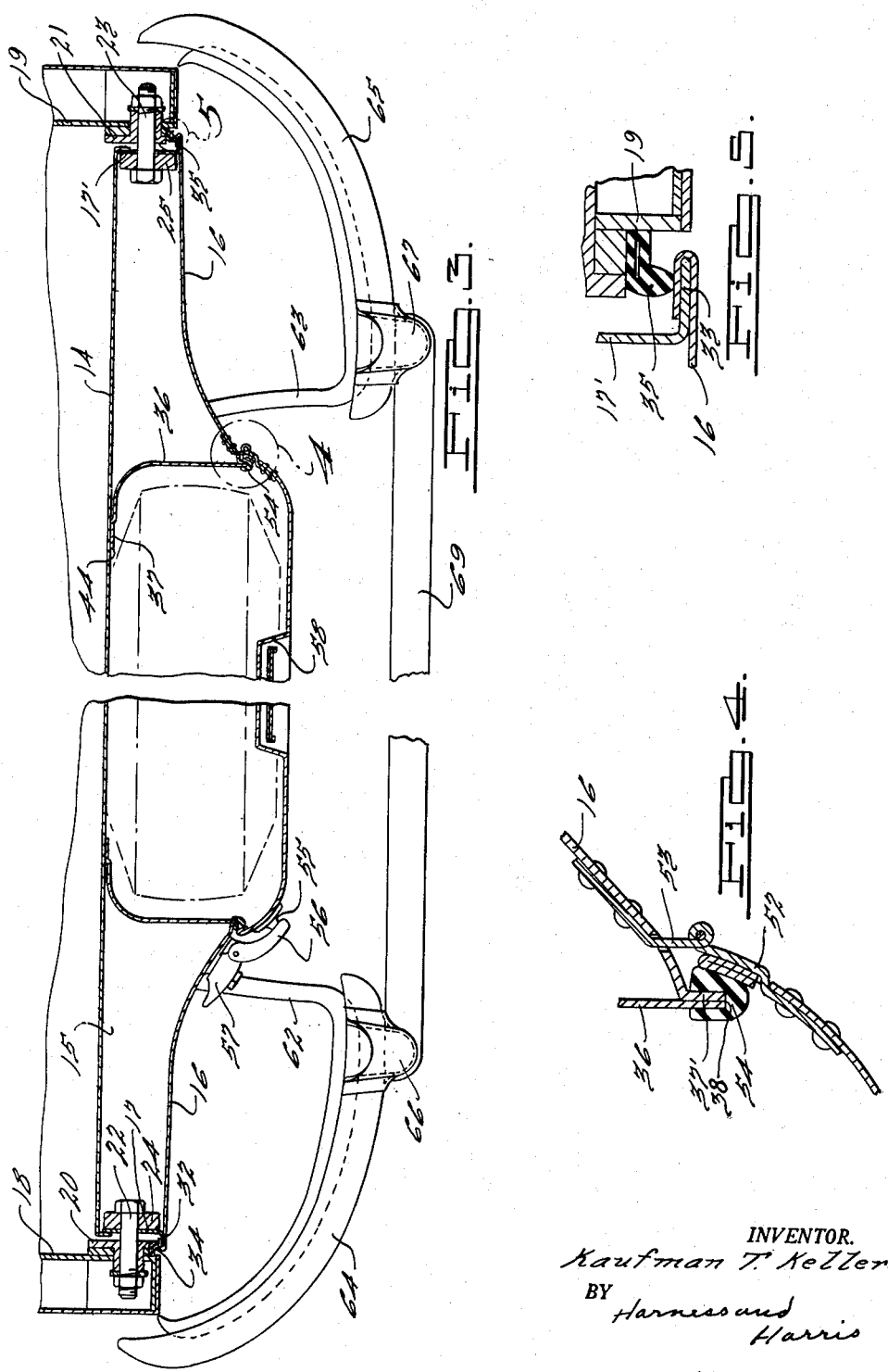

2,610,083

UNITED STATES PATENT OFFICE 2,610,083

VEHICLE DOOR WITH SPARE TIRE COMPARTMENT

Kaufman T. Keller, Detroit, Mich., assignor to Chrysler Corporation, Highland Park, Mich., a corporation of Delaware Application April 9, 1949, Serial No. 86,567

1 Claim. (Cl. 296—37.2)

My invention relates to motor vehicles.

More particularly my invention relates to improved and novel structure for carrying and storing the spare tire with which a motor vehicle is customarily provided.

A principal object of my invention is to provide a spare tire storage compartment and mounting structure between the inner and outer walls of a door structure of a motor vehicle.

Another object of my invention is to provide in a motor vehicle an improved spare tire storage compartment which is accessible from the exterior of the vehicle and which does not occupy any of the otherwise available occupant or luggage accommodating space.

A further object of my invention is to provide a motor vehicle with improved tire storing structure which completely conceals the tire from view.

An additional object of the invention is to provide a spare tire storage compartment in the space between the inner and outer walls of a tail gate type door structure of the kind with which so-called panel body delivery trucks and station wagons are provided.

A still further object of the invention is to provide a hinged door for a spare tire storage compartment of this character.

Other objects and advantages will become apparent from the following description of one embodiment of my invention, reference being had to the accompanying drawings in which:

Fig. 1 is an elevational view of the rear end of a motor vehicle embodying my invention.

Fig. 2 is a vertical sectional view taken on the line 2—2 of Fig. 1.

Fig. 3 is a horizontal sectional view taken on the line 3—3 of Fig. 1.

Fig. 4 is an enlarged horizontal sectional view of the structure within the circle 4 of Fig. 3.

Fig. 5 is an enlarged horizontal sectional view of the structure within the circle 5 of Fig. 3.

Referring to the drawings, I have shown a motor vehicle generally designated by the numeral 10 which includes a body 11 mounted on a conventional vehicle chassis including wheels 12. The body 11 has a rear door structure which includes a tail gate assembly, generally designated by the numeral 13, and an upper section 6 which is pivotally attached at its upper edge to the roof portion of the vehicle body 11 by hinges 7. The tail gate assembly 13 is hollow and comprises an inner panel or wall 14 of rectangular configuration having the lower lateral edge thereof bent outwardly to form a flange 15 which provides the bottom wall of the hollow tail gate structure. The upper lateral edge of the panel 14 is bent outwardly to form a narrow flange 15'. The flange 15' is disposed above and preferably spot welded to an inwardly extending flange 16' formed on the upper edge portion of an outer panel 16. The flange 16' provides the upper wall of the hollow tail gate structure. The flange 16' at the upper edge portion of the panel 16 is directly connected to the inner panel 14 as heretofore set forth, while the side lateral edges of the outer panel 16 are spaced relative to the lateral side edges of inner panel 14 and connected together by side panels 17 and 17' as more clearly shown in Fig. 3. The lower lateral edge of the outer panel 16 is secured to the outer edge of the flange 15 of the inner panel 14.

The gate assembly 13 is pivotally mounted at its lower end portion on the body 11 at the lower end of the body, namely, the side rails 18 and 19. The side rails 18 and 19 are provided with bearings 20 and 21 which are secured thereto and which receive one end of pivot bolts 22 and 23, respectively. The other ends of the bolts 22 and 23 are received within bearings 24 and 25 which are secured to the side panels 17 and 17', respectively. The bearings 24 and 25 are secured to the panels 17 and 17', respectively, by bolts 26 as more clearly seen in Fig. 2. The tail gate assembly 13 is releasably retained in its vertical position by the engagement of a shoulder 27 formed in the flange 16' of the outer panel 16, against a seal 28 which is disposed between the shoulder 27 and a lip 29 formed on the lower edge of the upper swingable section 6 which has a glass window 31 disposed therein. Further leftward movement of the assembly 13 about the pivot bolts 22 and 23, as shown in the drawings, is restricted by lips 32 and 33 which are integral with the lateral side portions of the outer panel 16 and which envelop the edges of the side panels 17 and 17'. Seals 34 and 35, respectively, comprising resiliently yieldable material, such as rubber, are disposed between the lips 32 and 33 and the adjacent vehicle body structure.

The inner panel 14 is substantially disposed within a single plane and the central portion of the outer panel 16 is flared outwardly to form a relatively deep central annular chamber which is provided with a circular opening 38 located in the outer panel 16. Disposed in the central annular chamber of the hollow tail gate structure is a cup-like member 36 of cylindrical configuration which has a closed end 37 secured, in a conventional manner such as by welding, to the inner surface of the inner panel 14. The cup-like member 36 has an open end similarly secured to the outer panel 16 in registration with the circular opening 38 therein. The edge portions of the outer panel 16 which surround the opening 38 are bent outwardly to provide a rearwardly extending circular flange 37' in which the outer edge portions of the cup-shaped member 36 are received. The cup-shaped member 36 and flange 37' are preferably welded together to form a rearwardly protruding lip. The lowermost surface of the cylindrical side of the member 36 is secured to the flange 15. A U-shaped bracket 39 has its leg portions 40 and 41 secured to the inner panel 14 by bolt and nut assemblies 42 and 43, these leg portions extending through an opening 44 in the closed end 37 of the cup-like member 36. The bracket 39 has a bight portion 45 which is provided with fixed nuts 46 and 47 which receive standard automobile tire bolts 48 and 49, respectively. The bolts 48 and 49 are adapted to extend through the standard openings at the center portion of a vehicle wheel such as that indicated by the dotted lines at 50. The vehicle wheel 50 with a spare tire mounted on it is adapted to be positioned within the cup-like member 36 and to be secured therein by merely placing the standard bolts such as 48 and 49 through the holes, as heretofore mentioned, and threading them into the nuts 46 and 47, respectively. With the foregoing structure, standard types of wheel mounting bolts, such as 48 and 49, may be employed for securing the spare tire and wheel assembly in place.

The tail gate assembly 13 is provided with a dished-shaped cover 51 which is pivotally mounted on the outer panel 16 by a hinge comprising hinge members 52 and 53 secured to the cover 51 and outer panel 16, respectively, and which is employed to cover the opening 38 in the outer panel 16. The lip formed by the flange 37' and adjacent edge portions of the cup-shaped member 36 is provided with a seal 54 which engages the edge portion of the cover 51 and thus prevents the entrance of any foreign matter within the cup-like member 36 which is adapted to house the vehicle tire and wheel assembly 50. The hinge members 52 and 53 are located at one side of the cover 51 while a projection 55 is secured to the opposite side of the cover 51. The projection 55 engages one end of an arm 56, the other end of which is connected to a lock mechanism 57 which is adapted to be secured in a locked position to prevent unintended access to the wheel and tire assembly.

The cover 51 is provided with a centrally located rectangular recess 58 in which is disposed a bracket 59 and a light 60. The bracket 59 is adapted to support a vehicle license plate 61, the configuration of the recess 58 being such as to accommodate a symmetrical arrangement of the license plate 61 and the light 60. The wiring for the light 60 which extends around the hinge members 52 and 53 as well as around one of the pivot bolts 22 and 23 has not been shown in the drawings for the purpose of clarity of the other structure involved.

The vehicle chassis is provided at its rear end with bumper brackets 62 and 63 which are secured to the side rails 18 and 19 and which carry bumpers 64 and 65, respectively. The bumpers 64 and 65 are provided with bumper guards 66 and 67, respectively, which are pivotally secured thereto by pins, one of which is shown at 68. The bumper guards 66 and 67 are connected together by a bar 69 which spans the space between the bumpers 64 and 65 at the rear of the vehicle. The bumper guards 66 and 67 and connecting bar 69 are adapted to pivot about the axes of the pins 68 to a substantially horizontal position, as shown by the doted lines in Fig. 2, so that the tail gate assembly 13 may be lowered to its open position, as indicated by the dotted lines in Fig. 2 without interference from the bumper guards. When the bumper guards 66 and 67 and the connecting bar 69 are rotated to their lower dotted line positions shown in Fig. 2, the cover 51 may be pivoted to its open position without encountering obstruction by the connecting bar 69.

By providing the structure as heretofore set forth, the spare tire of the vehicle is not only accessible from the exterior of the vehicle but completely concealed from sight. As a result, the tire and wheel assembly is conveniently stored in a vehicle without consuming any of the passenger or luggage space thereof.

While I have illustrated and described but one embodiment of my invention, it is to be understood that such is for the purpose of illustration only, and it is contemplated that those skilled in the art may modify certain details without departing from the spirit or scope of the invention as defined in the claim appended hereto.

I claim:

A tail gate assembly adapted for pivotal attachment to a vehicle body comprising a substantially planar inner panel, an outer panel spaced from said inner panel and having an outwardly flared portion, said portion having a circular opening therein, a cup-like member of cylindrical configuration secured between said inner and outer panels and defining a chamber for a vehicle spare tire, the open circular end of said cup-like member being secured to said outer panel in registration with said circular opening and thereby rigidifying said outer panel, a bracket secured to said inner panel and extending toward said opening for receiving and positioning the spare tire within said cup-like member, and a cover disposed over said opening and cup-like member and swingably supported on said outer panel.

KAUFMAN T. KELLER.

REFERENCES CITED

The following references are of record in the file of this patent:

UNITED STATES PATENTS

| Number | Name | Date |
|---|---|---|
| 1,850,826 | Burney | Mar. 22, 1932 |
| 2,094,328 | Lyon | Sept. 28, 1937 |
| 2,109,665 | Fergueson | Mar. 1, 1938 |
| 2,117,049 | Widman et al. | May 10, 1938 |

FOREIGN PATENTS

| Number | Country | Date |
|---|---|---|
| 109,526 | Sweden | Jan. 11, 1944 |
| 467,714 | Great Britain | June 22, 1937 |
| 836,168 | France | Oct. 10, 1938 |